US007275066B2

(12) United States Patent
Priestley

(10) Patent No.: US 7,275,066 B2
(45) Date of Patent: Sep. 25, 2007

(54) LINK MANAGEMENT OF DOCUMENT STRUCTURES

(75) Inventor: Michael Priestley, Toronto (CA)

(73) Assignee: International Business Machines Corporation, Armonk, NY (US)

(*) Notice: Subject to any disclaimer, the term of this patent is extended or adjusted under 35 U.S.C. 154(b) by 720 days.

(21) Appl. No.: 09/927,103

(22) Filed: Aug. 10, 2001

(65) Prior Publication Data

US 2003/0018650 A1 Jan. 23, 2003

(30) Foreign Application Priority Data

Jul. 23, 2001 (CA) .................................... 2353682

(51) Int. Cl.
*G06F 17/30* (2006.01)
(52) U.S. Cl. .................. 707/103 R; 707/100; 707/101
(58) Field of Classification Search .................... 707/1, 707/10, 103 X, 104, 102, 101, 100; 370/17, 370/94.3
See application file for complete search history.

(56) References Cited

U.S. PATENT DOCUMENTS

| 5,132,900 | A | | 7/1992 | Gilchrist et al. ............. 364/419 |
|---|---|---|---|---|
| 5,179,718 | A | | 1/1993 | MacPhail ..................... 395/800 |
| 5,289,460 | A | * | 2/1994 | Drake et al. .................. 370/245 |
| 5,434,962 | A | * | 7/1995 | Kyojima et al. ............. 715/513 |
| 6,035,330 | A | * | 3/2000 | Astiz et al. .................. 709/218 |
| 6,044,378 | A | | 3/2000 | Gladney ..................... 707/103 |
| 6,049,799 | A | | 4/2000 | Mangat et al. ................ 707/10 |
| 6,061,700 | A | * | 5/2000 | Brobst et al. ................ 715/517 |
| 6,122,647 | A | * | 9/2000 | Horowitz et al. ............ 715/513 |
| 6,182,091 | B1 | | 1/2001 | Pitkow et al. ............... 707/501 |
| 6,185,560 | B1 | * | 2/2001 | Young et al. .................. 707/6 |
| 6,189,019 | B1 | * | 2/2001 | Blumer et al. .............. 715/513 |
| 6,356,913 | B1 | * | 3/2002 | Chu et al. ............... 707/103 R |
| 6,466,940 | B1 | * | 10/2002 | Mills .......................... 707/102 |
| 6,718,329 | B1 | * | 4/2004 | Selvin et al. .................. 707/10 |
| 6,750,883 | B1 | * | 6/2004 | Parupudi et al. ............. 715/763 |
| 6,772,139 | B1 | * | 8/2004 | Smith, III ....................... 707/3 |
| 6,792,475 | B1 | * | 9/2004 | Arcuri et al. ................ 709/245 |
| 6,795,098 | B1 | * | 9/2004 | Emrani ........................ 715/837 |
| 7,181,734 | B2 | * | 2/2007 | Swamy et al. .............. 717/144 |

FOREIGN PATENT DOCUMENTS

EP 500262 8/1992

OTHER PUBLICATIONS

Priestley, Michael, "Managing web relationships with document structures", at http://mpriestl.torolab.ibm.com/papers/extreme/prie0115.htm , 15 pages, Aug. 13, 2000.

(Continued)

*Primary Examiner*—Neveen Abel-Jalil
(74) *Attorney, Agent, or Firm*—Kunzler & McKenzie

(57) ABSTRACT

Links are managed and units of information are linked based on a list having identifiers placed in a hierarchical order relative to other identifiers, the identifiers for identifying the units of information. Lists are stored and examined to determine the hierarchical order of the identifiers relative to the other identifiers, and a unit of information is linked to at least one other unit of information based on a relative hierarchical order between an identifier identifying the unit of information and another identifier identifying at least one other unit of information.

18 Claims, 14 Drawing Sheets

OTHER PUBLICATIONS

Don R. Day, Dave Priestley, A. Schel, "Introduction to Darwin Information Typing Architecture", at http://www-106.ibm.com/developerworks/xml/library/x-dital/index.html, 5 pages, Mar. 2001.

"Muon Identifiers", Internet address http://www.usatlas.bnl.gov/~dladams/muid/, Version 1.2.1, Nov. 14, 2001, Adams.

* cited by examiner

LINK MANAGEMENT OF DOCUMENT STRUCTURES

TECHNICAL FIELD OF THE INVENTION

This invention relates to managing links and more specifically to inter-linking a multitude of units of information such as web pages or help files and the like.

BACKGROUND

As a result of increased use of the World Wide Web (WWW) and computerized help files, rapid design and generation of web pages or help files is a necessity. Referring to FIG. 1, there is depicted a link management system provided by the prior art. An information developer creates units of source information 102A, 102B and 102C having information content 104A, 104B and 104C, and links 106A, 106B and 106C respectively. An example of units of information is a collection of web pages for a corporate web site wherein the web pages are inter-linked by URLs (Uniform Resource Locators) links. There are many well known application programs for generating and linking web pages such as Dreamweaver™ available from Macromedia of California, U.S.A. Another example of units of information is a collection of help files that are inter-linked by URL links. The collection of help files are used in a computer program application, such as a word processing application like Lotus™ Word Pro™ available from IBM Corporation of New York, U.S.A., to provide assistance to users of the computer program. There are many well known application programs for generating and linking help pages such as RoboHelp™ available from eHelp Corporation of California. Content 104A, 104B and 104C includes textual and/or graphic information for displaying the information to end users or information consumers. Links 106A, 106B, 106C link the units 102A, 102B, 102C together in a manner determined by the information developer. It will be appreciated that units 102A, 102B, 102C, content 104A, 104B, 104C, and links 106A, 106B, 106C reside in memory 110 of a computer system 108. Memory 110 is operationally connected to central processing unit 112, which in turn is operationally connected to display 114 and keyboard/mouse 116 to allow the information developer to manage (i.e., create, view, modify, delete) various aspects of units 102A, 102B, 102C, content 104A, 104B, 104C, and links 106A, 106B, 106C.

More specifically, the information developer develops units of source information 102A, 102B and 102C such that link 106A of unit 102A points to unit 102B, link 106B of unit 102B points to unit 102C, and link 106C of unit 102C points to unit 102A. It will be appreciated that the linking of the units of information is set up to achieve the purposes of the information developer. When the information developer develops a new unit of source information 102D, the developer must decide which links to add, delete or modify in order to integrate the linking of unit 102D with the existing linked units 102A, 102B and 102C. For example, the information developer may decide that link 106C should point to unit 102D and link 106D should point to unit 102A and then must modify link 106C and enable link 106D accordingly to met this new requirement or purpose. It will be appreciated that each time the information developer creates, deletes or modifies various units of source information, the links embedded in each unit of source information must be individually updated, which is generally inconvenient especially when the developer is responsible for developing a multitude of units of source information which over time will evolve and may require constant effort for updating the links. In an inconvenient and disorganized manner, the system 100 intermixes the information content and the links into a potentially unruly tangle of links and information content which will become very difficult to disentangle when changes to the linking of the units of information is required.

Referring to FIG. 2, there is depicted another link management system 200 provided by the prior art. An information developer creates units of source information 202A, 202B having information content 204A, 204B respectively. A generator 210 having a compiler 208 or equivalent, reads computer programmed instructions 206 having programmed assignments for explicitly stating an arbitrary, inter-linking assignment between units of source information 204A and 204B, and follows instructions 206 to insert desired links in various units of information 212A, 212B. Generator 210 generates units of target information 212A, 212B having content 214A, 214B and links 216A, 216B respectively. The links 216A, 216B are explicitly defined in computer programmed instructions 206. Several examples of system 200 are XLINK Library which was developed by W3C (World Wide Web Consortium), Topic Maps which was developed as an ISO (International Standards Organization) standard, and RDF Resource Descriptor which was developed by Framework under the guidance of the W3C.

It will be appreciated that content 204A, 204B includes textual and/or graphic information. Instructions 206 includes computer programmed instructions that explicitly state or define desired linking relationships between various units of source information 202A, 202B or units of target information 212A, 212B. An example of programmed instructions of instructions 206 is revealed in Appendix 1.

Compiler 208 reads and interprets or converts the instructions 206 to direct the generator 210 to generate units of target information 212A, 212B. Instructions 206 provides computer programmed instructions for instructing a Central Processing Unit (CPU), via generator 210, to generate content 214A, 214B; for example, content 214A includes content 204A, and content 214B includes content 204B. Also, instructions 206 provides explicit instructions for instructing the generator to insert links 216A, 216B for pointing to various generated units of target information; for example, link 216A links unit 212A to unit 212B, and link 216B links unit 212B to unit 212A. It will be appreciated that each unit of target information will be linked to at least one other unit of target information. When new units of information are to be added or existing units of information are to be removed, or when the linking relationships between various units of information are changed, the information developer makes changes to instructions 206 and causes generator 210 to read the adapted or changed instructions to regenerate units of target information 212A, 212B.

It will be appreciated that units of information 202A, 202B, 212A, 212B, instructions 206 and generator 210 all reside in memory 220 of computer system 218. Memory 220 is operationally coupled to CPU 222, which in turn is operationally coupled to display 224 and keyboard/mouse 226 so that the developer can view and adapt instructions 206 accordingly to achieve the purposes of the task of inter-linking the units of source information 202A and 202B.

While the units of source information and the instructions are generated separately, the instructions require the information developer to learn and become proficient in a new computer programming language, techniques, or procedures, which places an additional and inconvenient learning curve or burden on the information developer. Additionally, if the information developer were to be replaced, a new information developer would face the inconvenient task of debugging instructions 206 to determine the inter-linking relationships between units of target information 212A and 212B. The structure of instructions 206 indicating the locations of the various information content does not correspond to the structure of the relationships between the units of target information. The instructions 206 stores information about relationships but the structure of the instructions of instructions 206 does not express these relationships.

Generally, the prior art provides inadequate methods for inter-linking units of information. Time is wasted on individually updating each unit of information or on learning new programming languages, techniques, or procedures to configure explicit assignments of inter-linking relationships between units of information. Accordingly, a link management system which addresses, at least in part, these and other shortcomings is desired.

SUMMARY OF THE INVENTION

The present invention provides a mechanism for generating units of target information from created units of source information by referring to a listing of identifiers. A unit of target information is created for each identifier, and each created unit of target information is linked to at least one other unit of target information. The criteria for determining which units of target information are linked to specific other units of target information is encoded implicitly in the relative hierarchy and/or ordering of the identifiers in a listing. In this manner, an information developer avoids having to learn a computer programming language, techniques, or procedures for explicitly stating the linking relationships of the various units of target information, and in stark contrast to the prior art, the invention enables the information manager to manage the structure of a listing of identifiers for creating links in units of information.

In a first aspect of the present invention, there is provided a link management system for creating links amongst units of information based on a list of identifiers arranged in an hierarchical order wherein each identifier identifies an associated unit of information, the system including means for storing the list of identifiers, means for examining the list of identifiers to determine the hierarchical order of the identifiers within the list of identifiers, means for linking a unit of information to at least one other unit of information based on the relative hierarchical order of identifiers including an identifier identifying the unit of information and another identifier identifying the at least one other unit of information.

In a second aspect of the invention, there is provided a method performed on a computer system operationally coupled to computer readable memory for storing a list of identifiers, and the method for creating and managing links amongst units of information based on the list of identifiers arranged in an hierarchical order wherein each identifier identifies an associated unit of information, the method including the steps of storing the list of identifiers, examining the list of identifiers to determine the hierarchical order of the identifiers within the list of identifiers, linking a unit of information to at least one other unit of information based on the relative hierarchical order of identifiers including an identifier identifying the unit of information and another identifier identifying the at least one other unit of information.

In a third aspect of the invention, there is provided a computer program product for use in a computer system operatively coupled to a computer readable memory, the computer program product including a computer-readable data storage medium tangibly embodying computer readable program code for directing the computer to create and manage links amongst units of information based on a list of identifiers arranged in an hierarchical order wherein each identifier identifies an associated unit of information, the computer program product including code for instructing the computer system to store the list of identifiers, code for instructing the computer system to examine the list of identifiers to determine the hierarchical order of the identifiers within the list of identifiers, code for instructing the computer system to link a unit of information to at least one other unit of information based on the relative hierarchical order of identifiers including an identifier identifying the unit of information and another identifier identifying the at least one other unit of information.

A better understanding of these and other aspects of the invention can be obtained with reference to the following drawings and description of the preferred embodiments.

DRAWINGS OF THE INVENTION

The following figures are examples of the implementation of the present invention, in which.

DESCRIPTION OF THE PREFERRED EMBODIMENTS

Figure 1:
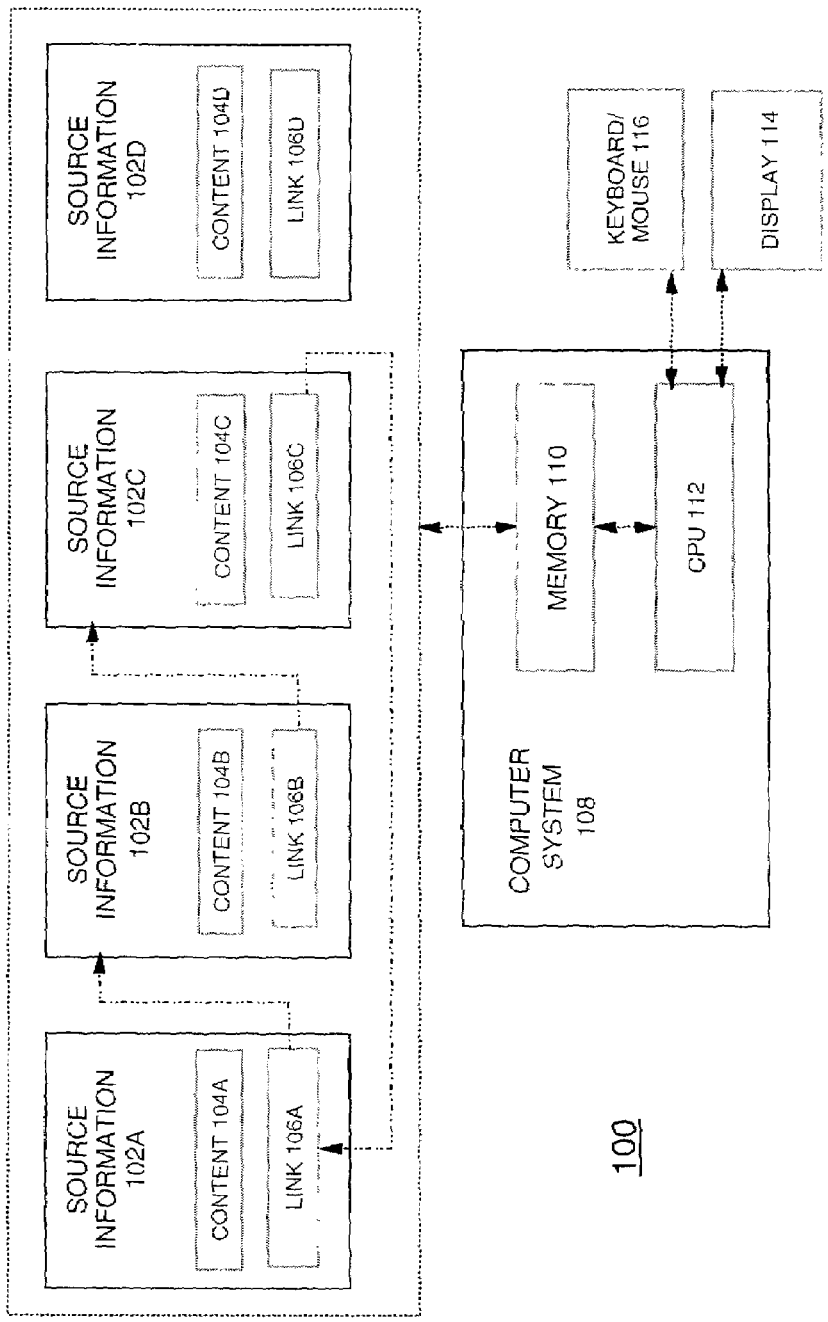
FIG. 1 depicts a prior art system.
Figure 2:
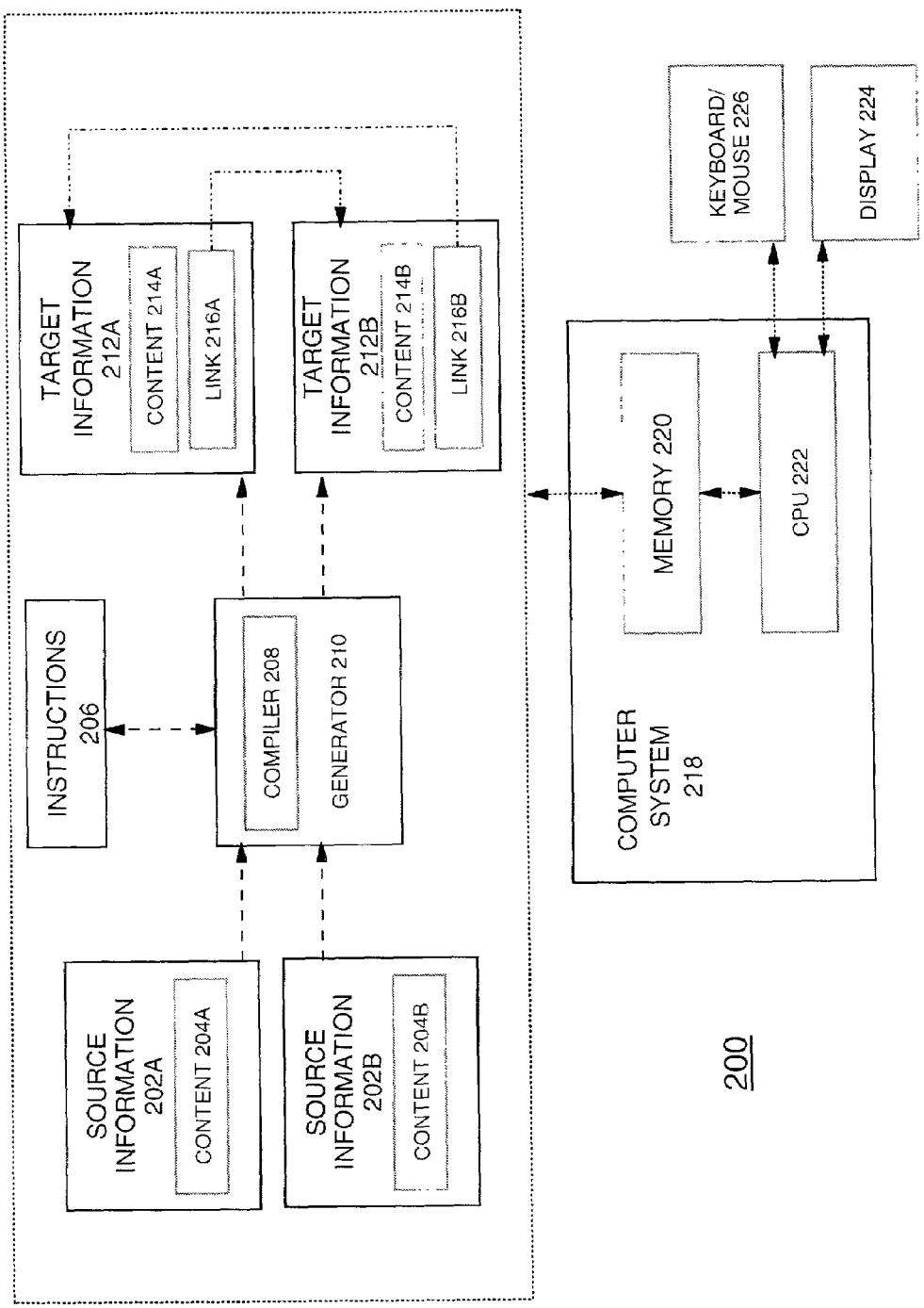
FIG. 2 depicts another prior art system.
Figure 3:
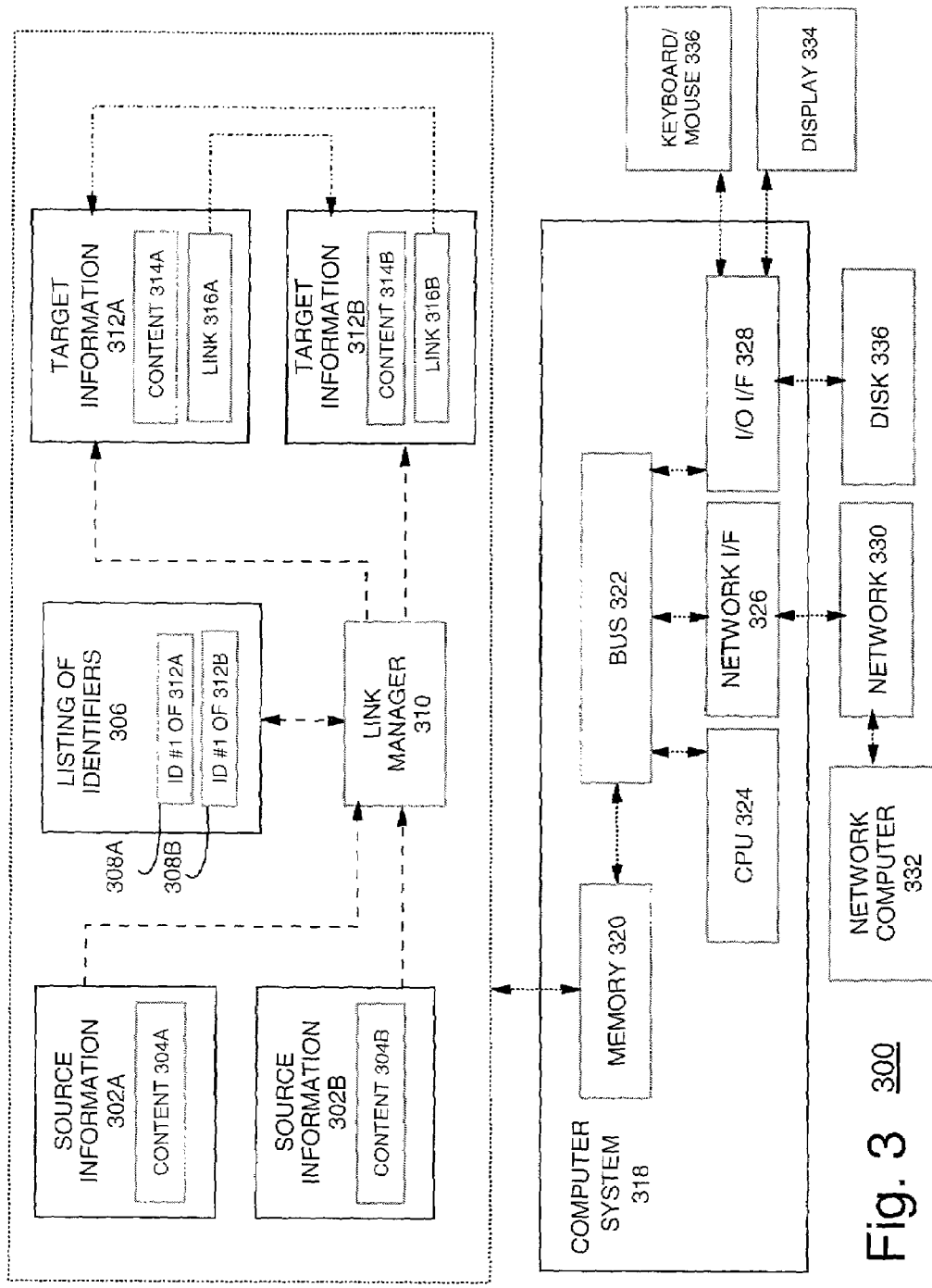
FIG. 3 depicts a link management system according to a first embodiment of the invention using a first listing of identifiers.

Referring to FIG. 3, there is depicted a link management system 300 of a first embodiment of the invention. Units of source information 302A and 302B each include content 304A and 304B respectively. Content 304A and 304B includes textual information and/or graphic information. Listing 306 includes identifiers 308A and 308B which are placed or positioned, by the information developer, in the listing 306 in a hierarchical order along with other identifiers of the listing 306. The hierarchical order implicitly reveals or provides information about desired inter-linking relationships between the units of target information 312A, 312B.

For example, a relative hierarchical order of the identifiers can be achieved by placing the identifiers in an ordered sequence in which one identifier precedes another identifier to indicate to the link manager 310 that the desired linking relationship of units of target information is a sequential inter-linking. Other hierarchical orders may be used in implementing the invention, some of which are subsequently mentioned in the description.

The term 'hierarchy' can include a ranking or ordering of identifiers of a listing. A listing of identifiers can be one in which the identifiers are placed in a series in which each identifier is ranked relative to other identifiers of the listing. A listing of identifiers can be organized into successive ranks or grades with each level subordinate to another level of identifiers of the listing.

Link manager 310 reads listing 306, units of source information 302A and 302B, or alternatively reads source information content 304A, 304B, to generate units of target information 312A, 312B having content 314A, 314B and links 316A, 316B respectively. Identifiers 308A, 308B indicate to linking manager 310 to generate unit 312A, 312B respectively. Identifiers 308A, 308B indicate or identify to link manager 310 the links to be placed into links 316A, 316B of units of target information 312A and 312B respectively. Additionally, identifiers 308A, 308B can also indicate to linking manager 310 the information content to be placed into contents 314A, 314B of units of target information 312A, 312B respectively.

The system 300 links units of information based on a list having identifiers placed in a hierarchical order relative to other identifiers for identifying the units of information. The system 300 includes a mechanism for storing the list 306, such as memory 320, a mechanism for examining the list 306 to determine the hierarchical order of the identifiers relative to the other identifiers on the list, such as Document Object Model APIs (Application Programming Interface), a mechanism for linking a unit of information to at least one other unit of information, such as hypertext links, with the links being derived from the relative hierarchical order between an identifier identifying the unit of information and another identifier identifying at least one other unit of information.

Units of source information 302A, 302A, listing 306, link manager 310, units of target information 312A, 312B all reside in memory 320 of computer system 318. Memory 320 is operationally coupled to bus 322 for intercommunicating between various modules of computer 318. Bus 322 operationally couples memory 320, central processing unit (CPU) 324, network interface (I/F) 326, and input/output interface 328 together. Display 334, keyboard/mouse 336, and disk 336 are suitably connected to interface 328 by conventional mechanisms. Networked computer 332 is operationally connected to computer 318 via network 330 and suitable communications modules known to persons having ordinary skill in the art of networking.

Alternatively, it will be appreciated that link manager 310 can be adapted to operate so that units of source information can be created by an information developer and link manager 310 can generate the units of target information and overwrite the existing units of source information, such that the information developer perceives that the units of source information have been updated to include the links which where specified by the listing 306. Caution would have to be used when using this alternative arrangement because the original units of source information were deleted. To avoid this unpleasant scenario, the original units of source information should be placed in a backup directory or copied into a publishing directory before being processed.

System 300 can also be used with units of target information and units of source information. Identifiers of list 306 identify source information content of units of source information which are assigned to said units of target information. The system 300 includes a mechanism for generating the units of target information, a mechanism for examining list 306 to identify the source information content assigned to the units of target information, and a mechanism for inserting at least one source information content into a unit of target information.

It will be appreciated that a mechanism can be implemented or realized as a system having discreet electronic/electrical components or hardware, or can be implemented as a system having computer coded software instructions or modules, or can be implemented as a hybrid system having some hardware and some software modules as known by persons having ordinary skill in the art of computers.

Figure 4:
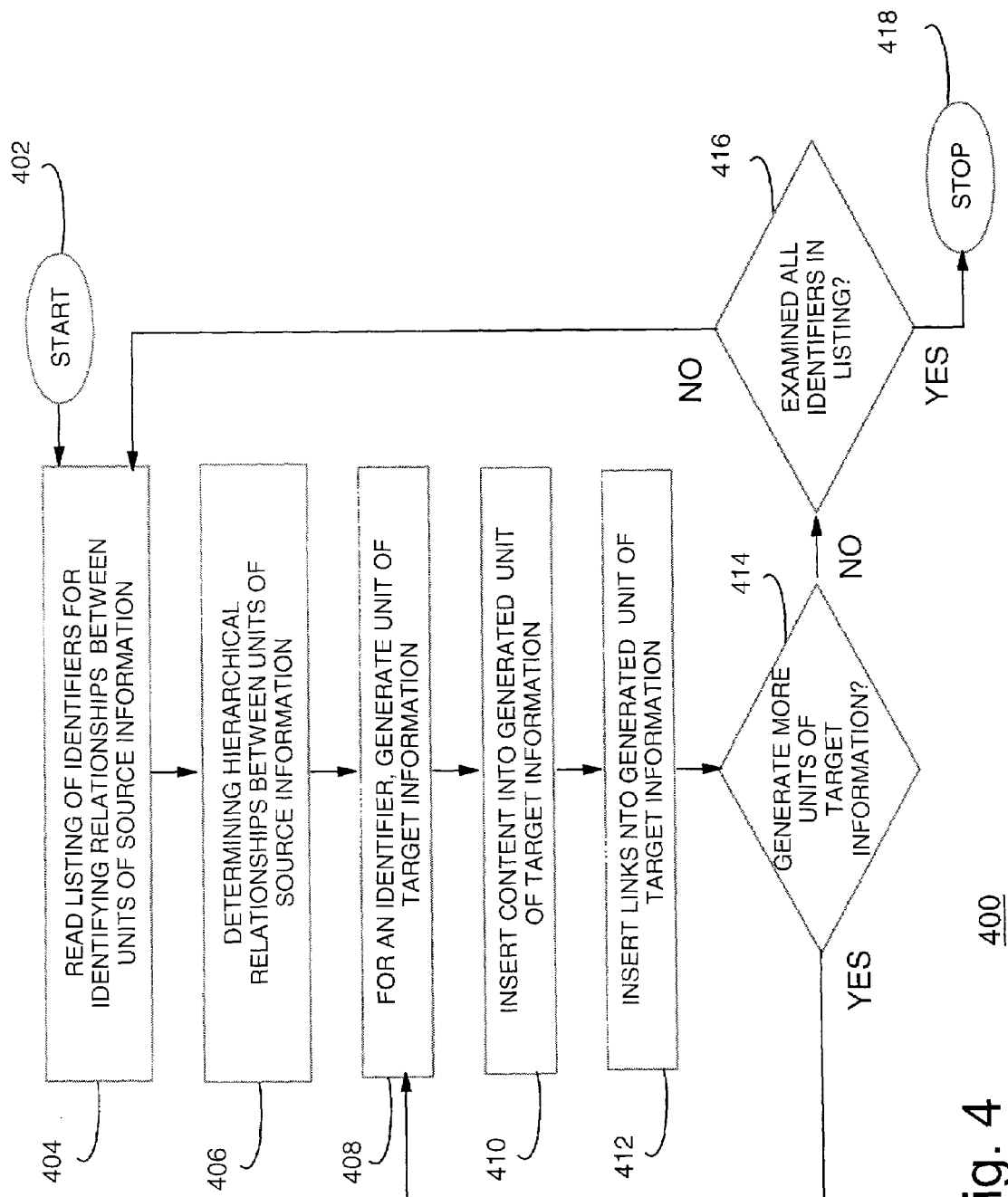
FIG. 4 depicts operations of the link management system of FIG. 3.

Referring to FIG. 4, there is depicted operations of link management system 300 of FIG. 3. It will be appreciated that operations depicted in the flowchart 400 will be performed by system 300. When system 300 is ready, 402 begins operations. In 404, link manager 310 reads listing 306 having identifiers 308A 308B for identifying a relative hierarchical order of linking relationships between units of source information 302A, 302B. The identifiers of list 306 are placed or positioned on the list in a hierarchical order relative to other identifiers of the list 306. Link manager 310 determines which units of target information will be inter-linked by examining the relative hierarchical order between identifiers of list 306 (406). In 408, link manager 310 will generate a unit of target information for each identified unit of target information. Once the unit of target information is generated, link manager 30 inserts content into the generated unit of target information if the identifier identifies information content to be placed into the unit of target information (410).

In 412, link manager 310 inserts links into the unit of target information for linking to other units of target information. The links are determined by decoding the hierarchical order of the identifiers relative to other identifiers of list 306. In 414, link manager 310 determines whether there are more units of target information to be generated. In 416, link manager 310 determines whether there are more identifiers to be examined. It will be appreciated that the process operations depicted in flowchart 400 are interactive steps or can be adapted to avoid interaction. In 418, processing stops.

Figure 5A:
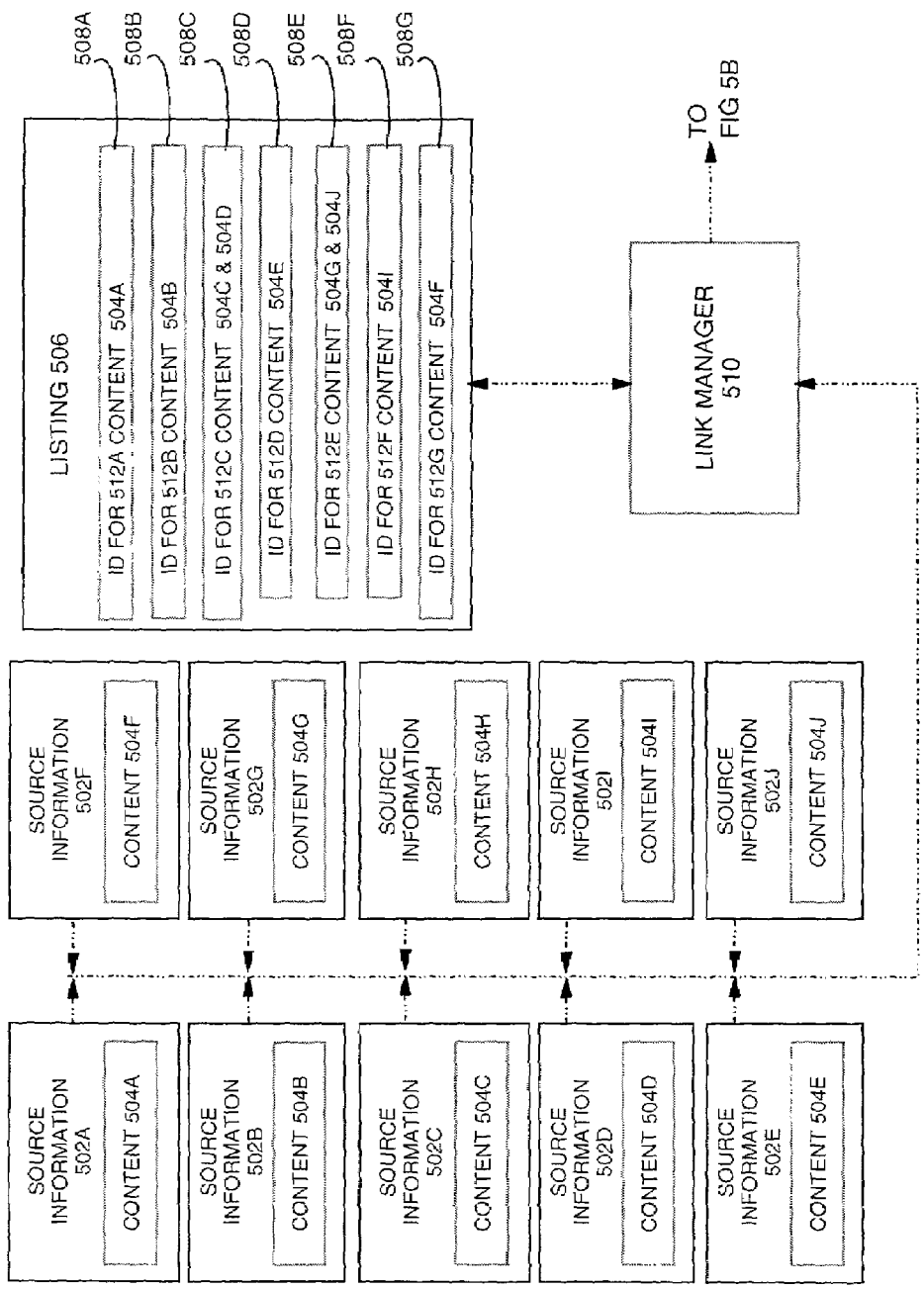
FIGS. 5A and 5B depict the link management system generating units of target information.
Figure 5B:
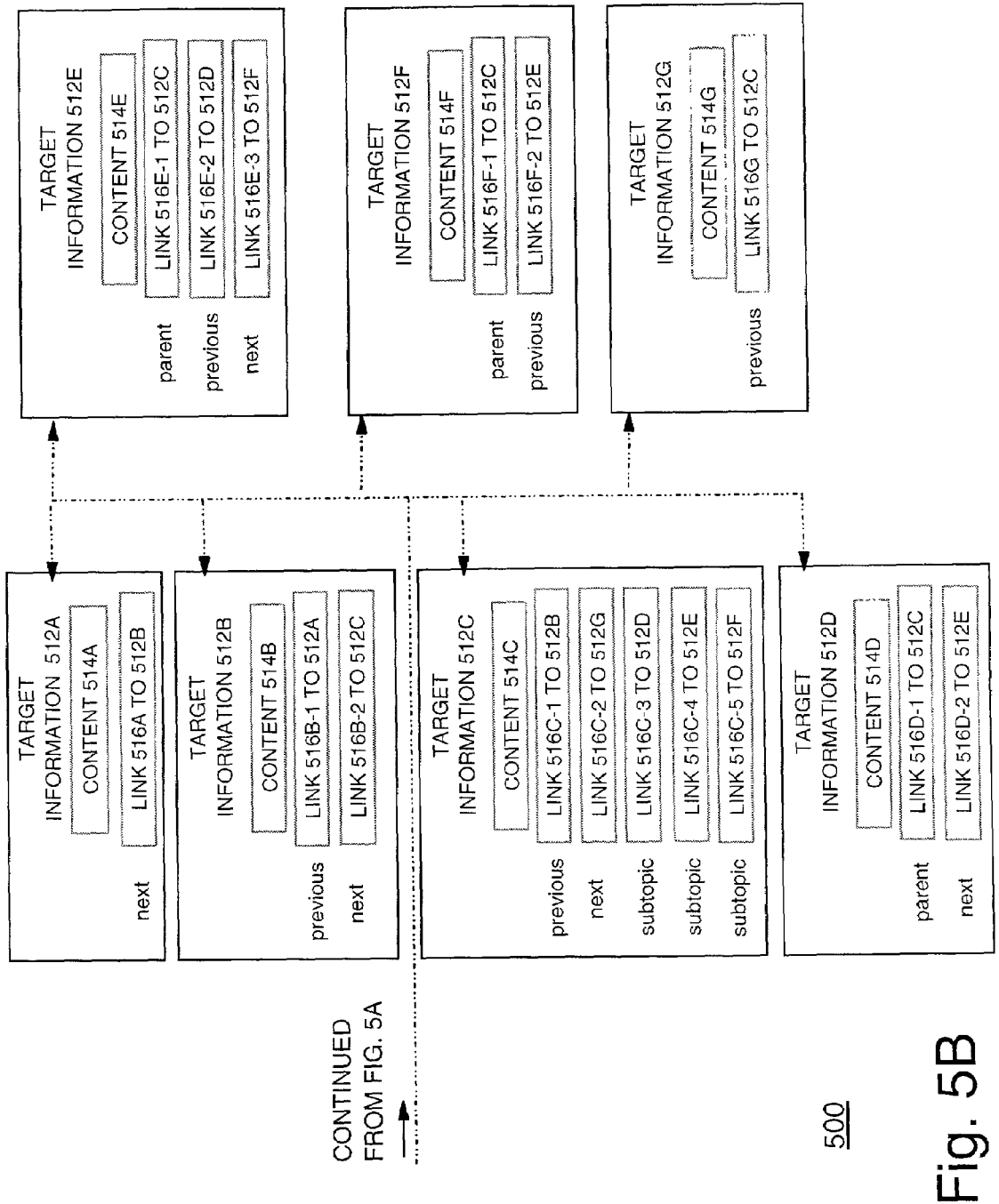

Referring to FIGS. 5A and 5B, there is depicted a link management system 500 which also operates in a similar fashion to the system 300 of FIG. 3. An information developer develops or generates source information 502A to 502J inclusive having information content 504A to 504J respectively. Listing 506 includes identifiers 508A to 508G inclusive, which are positioned or located in a hierarchical order along with the other identifiers of the listing 506 in which the information developer determined or selected prior to making list 506 available to link manager 510.

Link manager 510 will read listing 506 to generate units of target information 512A to 512G inclusively. Identifiers 508D, 508E, 508F are nested below identifier 508C which provides a visual clue that the inner nested identifiers are "children" of identifier 508C, in that the inner nested identifiers are sub-topics which are related to a main topic identified by identifier 508C. In this manner, further inter-nesting of selected topics can be hierarchically identified and ordered.

Identifier 508A identifies unit of information 512A to be generated by link manger 510, and also identifies that content 504A is to be placed into the content 514A of unit 512A. Since identifier 508B is positioned or located adjacently to identifier 508A, then link manager 510 will insert link 516A into unit 512A for linking unit 512A to unit 512B.

Identifier 508B identifies unit of information 512B to be generated by link manager 510, and also identifies that content 504B is to be placed into content 514B of unit 512B. Since identifier 508A is positioned adjacently to identifier 508B but appears previous to it in order, then link manager 510 will insert link 516B-1 into unit 512B for linking unit 512B to unit 512A. Link 516B-1 can be labelled as a "previous" link to indicate to the end user that there is a previous unit of information (512A) which precedes unit 512B.

Since identifier 508C is positioned adjacently to identifier 508B but appears after it in the listing order, then link manager 510 will insert link 516B-2 into unit 512B for linking unit 512B to unit 512C. Link 516B-2 can be labelled as a "next" link to provide a visual clue to the end user that there is another unit of target information (512C) which comes after unit 512B.

Identifier 508C identifies unit of target information 512C to be generated by link manager 510, and also identifies that content 504C and 504D are to be placed or inserted into content 514C of unit 512C. Since identifier 508B is positioned adjacently to identifier 508C but appears previous to it in the order, then link 510 will insert link 516C-1 into unit 512C for linking unit 512C to unit 512B. Link 516C-1 can be labelled as a "previous" link to visually indicate to the end user that there is a previous unit of target information 512B which comes before unit 512C. Since identifier 508G is positioned adjacently to identifier 508C in the same hierarchical level, but appears after it in the order, then link manager 510 will insert link 516C-2 into unit 512C for linking unit 512C to unit 512G, and link 512C-2 can be labelled as a "next" link to visually indicate to the end user that there is a next unit of target information 512G which comes after unit 512C.

Since identifiers 508D, 508E, 508F are positioned or located either within the markup boundaries of identifier 508C or somehow nested or indented after or below it in the list hierarchy, identifiers 508D, 508E, 508F identify sub-topics of unit 512C, then link manager 510 will insert links 516C-3, 516C-4, 516C-5 into unit 512C for linking unit 512C to respective units 512D, 512E and 512F. Links 516C-3. 516C-4, 516C-5 can be labelled as "children" links to provide a visual clue to the end user that units 512D, 512E, 512F are sub-topics of unit 512C. Within the nesting of identifiers 508D, 508E, 508F, there is no other sub-nesting.

Since identifier 508D is a child of parent 508C, then link manager 510 will insert link 516D-1 into unit 512D for linking unit 512D to unit 512C. Link 516D-1 can be labelled as a "parent" link to provide a visual clue to the end user that target information (512C) is the parent of unit 512D.

Identifier 508D identifies unit 512D to be generated by link manager 510, and also identifies that content 504E is to be placed or inserted into content 514D. Since identifier 508E is positioned/located adjacently to identifier 508D but appears after it in listing order, then link manager 510 will insert link 516D-2 into unit 512D for linking unit 512D to unit 512E. Link 516D-2 can be labelled as a "next" link as a visual clue to the end user that there is another unit of information that comes after unit 512D.

The remaining identifiers 508E, 508F, 508G are treated in a similar manner as described for identifiers 508A to 508D inclusive to generate and link units 512E, 512F, 512G respectively.

Figure 6:
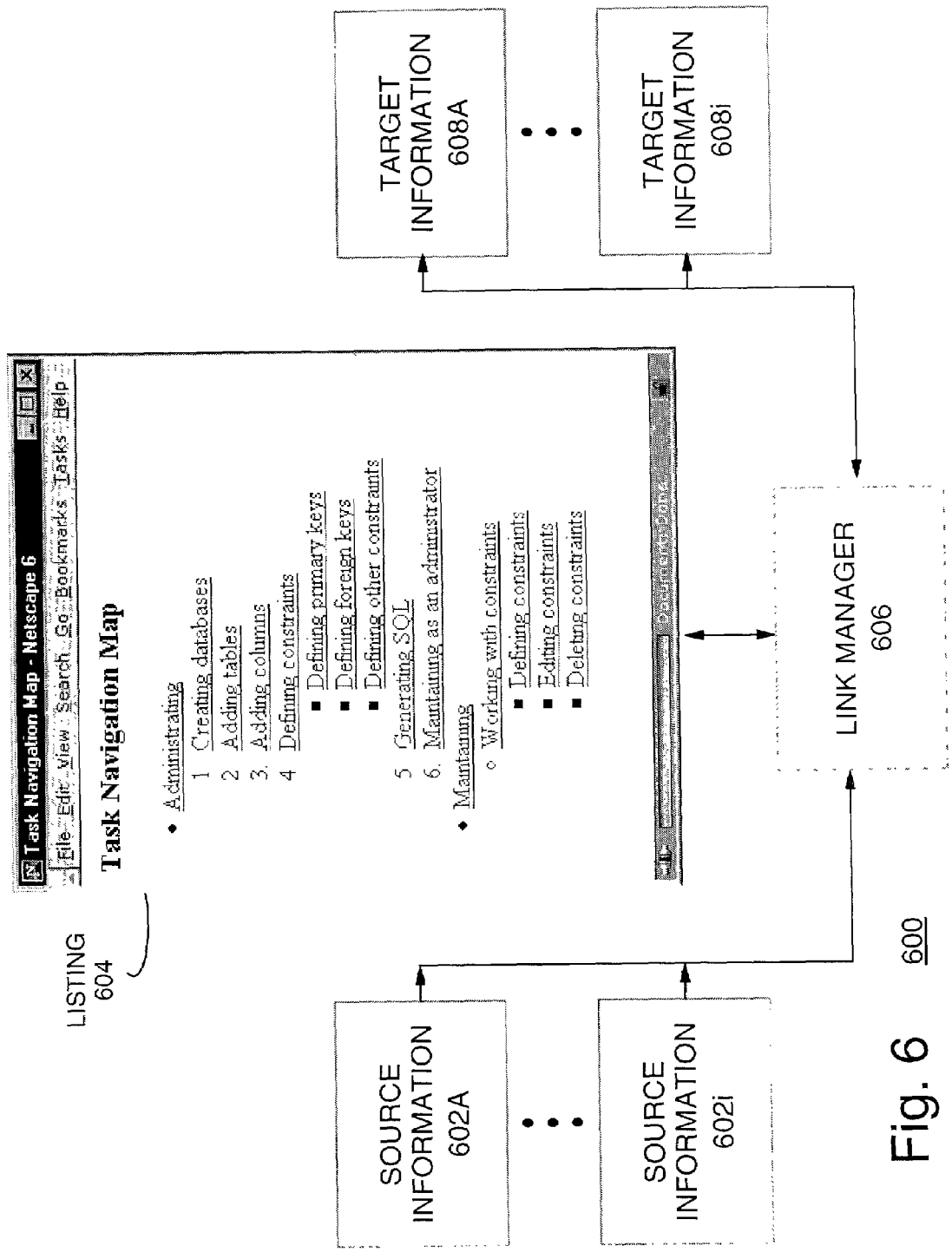
FIG. 6 depicts a link management system according to a second embodiment of the invention using a second listing of identifiers.

Referring to FIG. 6, there is depicted a link management system 600 of a second embodiment of the invention operating with units of source information 602A to 602$i$ inclusive and listing 604 to generate units of target information 608A to 608$i$ inclusive.

Listing 604 stores the inter-linking information implicitly in the structure of listing 604. Listing 604 is written in a markup language such as HTML (Hyper Text Markup Language) or defined by XML (Extensible Markup Language) which uses data tags for conveniently identifying units of source and target information and the data tags can also be positioned/located in a containment hierarchy, such that some tags contain other tags and their relative nesting and order can indicate relationships between units of target information, with the relationships ultimately expressed as hypertext links in the target information. Appendix 2 reveals the HTML code for listing 604.

List item data tag "<li>" and "</li>" encapsulate or identify list items, in which link manager 606 will create a unit of target information for each identified list item that is identified and encapsulated by the list item data tags.

Within each pair of matching list item data tags "<li>" and "</li>" there is another pair of data tags "<a href="file.htm">"title for unit of target information"</a>" for encapsulating or identifying a unit of source information or source content that will be placed or inserted into the unit of target information that is to be generated by link manager 606.

Within each matching pair of unordered list data tags, "<ul>" and "</ul>" there is encapsulated a nested list of list items which are identified or encapsulated by the appropriate list item data tags. The item of an unordered list are not ordered sequentially. Examples of items in an unordered list include topics "Defining constraints" and "Editing constraints" identified under topic "Maintaining" in list 604. The visual clue to the author (using an HTML editor) or end user (using a browser) is that the list item of an unordered list are preceded by a bullet.

Within each matching pair of ordered list data tags "<ol>" and "</ol>" there is encapsulated a nested list of list items which are identified by various list item data tags. The items of an ordered list are ordered sequentially. Examples of items in an ordered list include topics "1. Creating Databases" and "2. Adding Tables" identified under topic "Administrating" in list 604.

Figure 7:
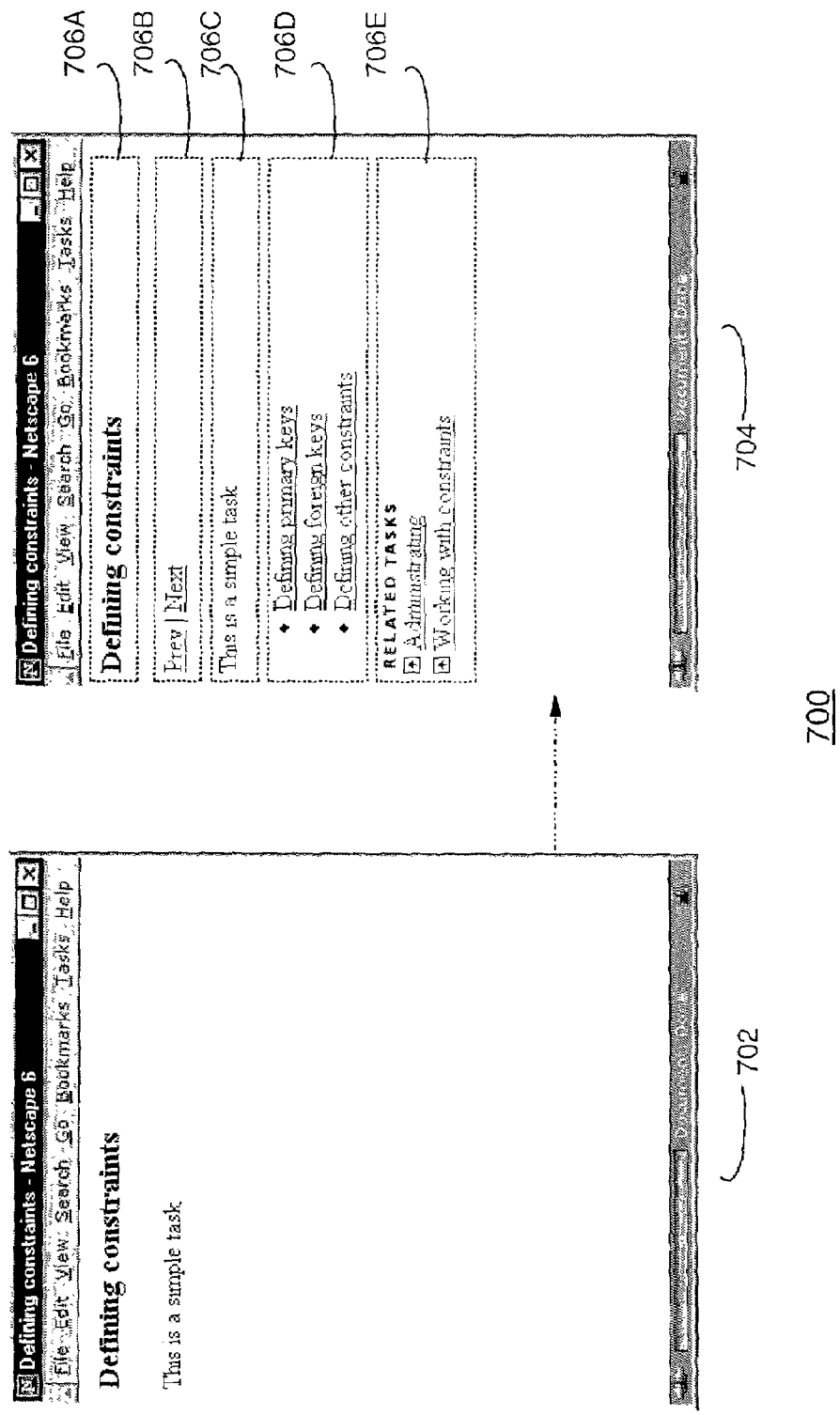
FIG. 7 depicts a first unit of target information generated by using the second listing of FIG. 6.

Referring to FIG. 7, there is depicted an example of a unit of source information 702 and a corresponding unit of target of information 704 which was generated by link manager 606 of FIG. 6 when link manager 606 read listing 604. Appendix 3 reveals the HTML code created by an information developer of the unit of source information 702. Appendix 4 reveals the HTML code generated by link manager 606, which is the unit of target information 704 which is identified in listing 604 as item "4. Defining Constraints". Box 706A shows the title of the unit of target information 704. Box 706B shows the "Previous" and "Next" links. The link "Prev" of unit 704 will link to a unit of target information identified as "te-adding_columns.htm" which is identified in listing 604 as item "3. Adding Columns". The link "Next" of unit 704 will link to a unit of target information identified as "te_generating_sql.htm" which identified in listing 604 as item "5. Generating SQL". Box 706C shows the information content "this is a simple task" was taken from unit of source information 702. Box 706D shows the links to the sub-topics of the unit of target information 704. Box 706E shows the links to the related tasks of unit 704. Box 706E contains links to parent topics (i.e., from sub-topics to their parent topics). The content identifier for "Defining constraints" appears twice in the listing, in each case under a unique identifier, so it has two parents.

Figure 8:
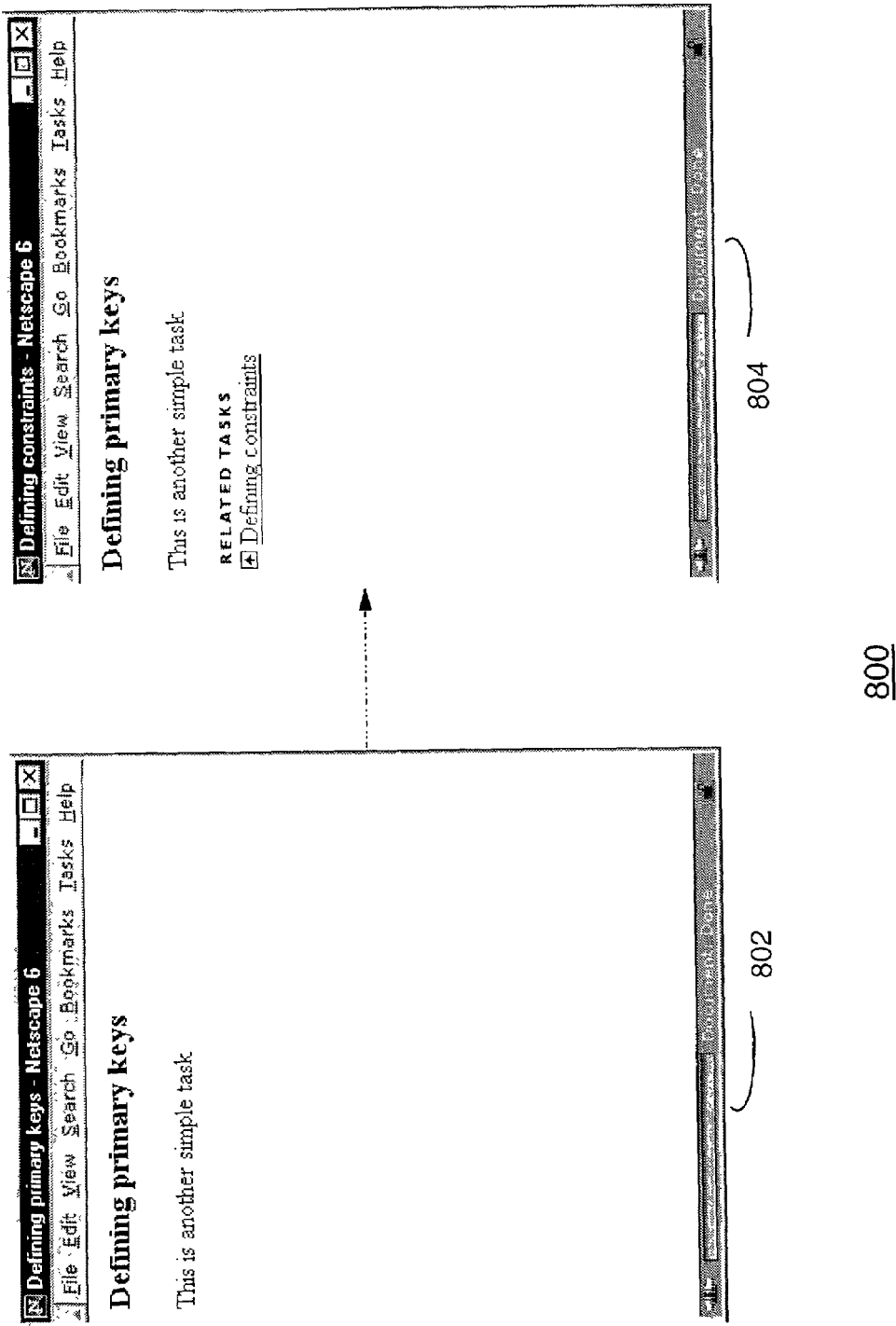
FIG. 8 depicts a second unit of target information generated by using the second listing of FIG. 6.

Referring to FIG. 8, there is depicted another example of unit of source information 802 and a corresponding unit of target information 804 which was generated by link manager 606 of FIG. 6 when link manager 606 of FIG. 6 read listing 604. Appendix 5 reveals the HTML code created by an information developer of the unit of source information 802 having information content "this is another simple task". Appendix 6 reveals the HTML code generated by link manager 606 which is unit of target information 804 as "Defining primary Keys" which is a sub-topic of "4. Defining constraints".

Figure 9A:
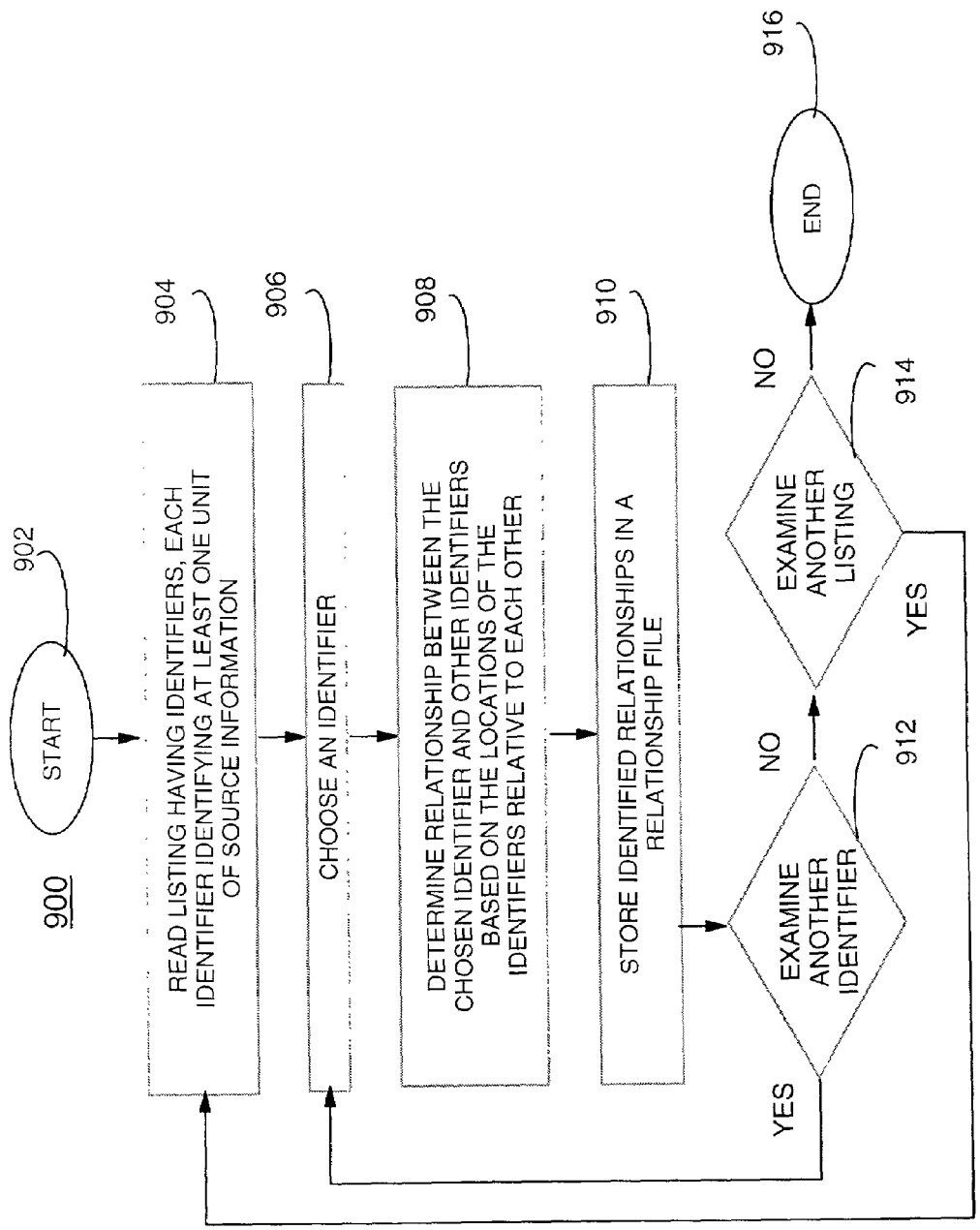
FIGS. 9A and 9B depict operations of the link management system of FIG. 6.
Figure 9B:
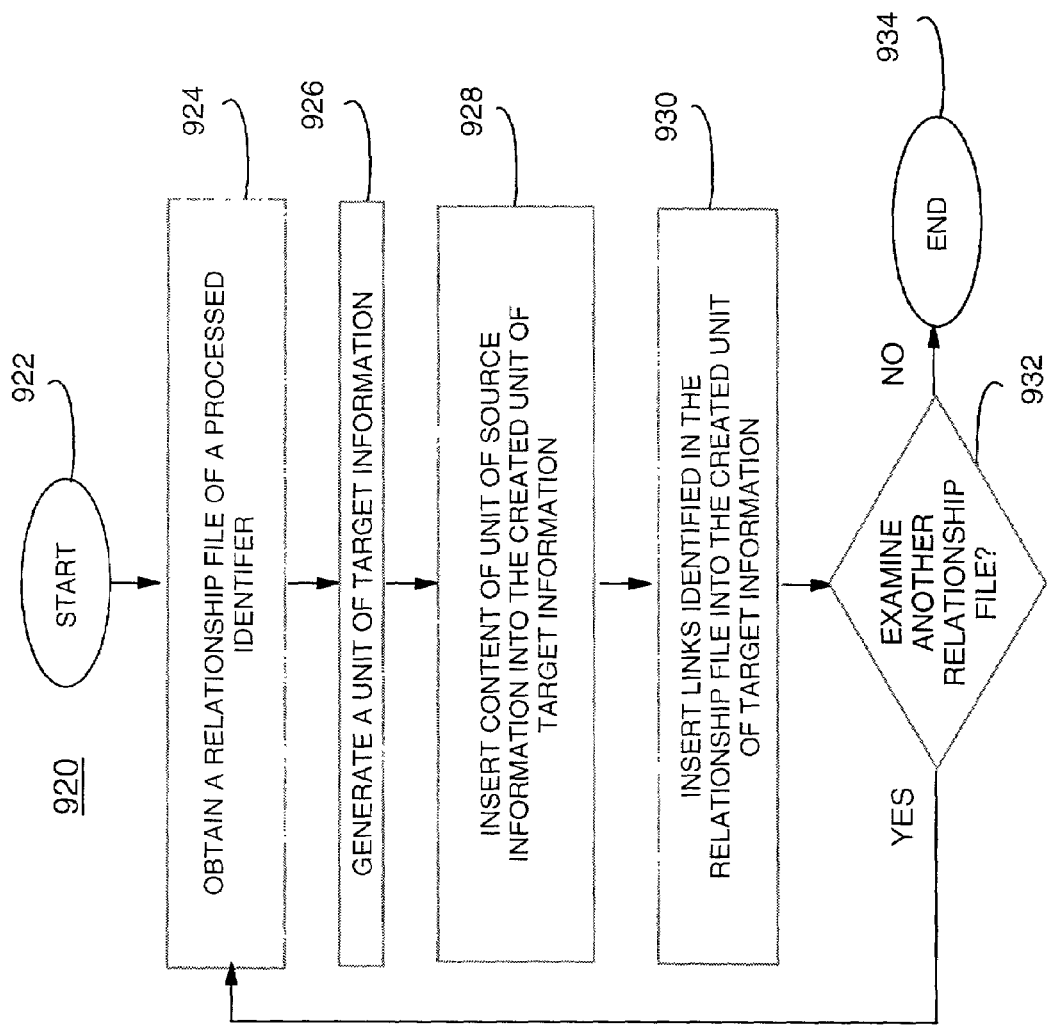

Referring to FIGS. 9A and 9B, there is depicted operations of link manager 606 of FIG. 6. Appendix 7 reveals the HTML code of link manager 606. The operations depicted in flowcharts 900 and 920 are performed by link manager 606 unless stated otherwise.

When link manager is ready, 902 begins a process for determining inter-linking relationships between units of target information identified in listing 604. In 904, link manager 606 reads listing 604 having identifiers for identifying units of source information to be processed by the link manager 606. The inter-linking relationships will be encoded in a hierarchical order of the identifiers relative to other identifiers positioned/located in the listing 604. In 906, link manager 606 picks or chooses an identifier from listing 604. Preferably, the first identifier is chosen when operations depicted in flowchart 900 is initially executed by link manager 606.

In 908, link manager 606 determines the inter-linking relationships between the chosen identifier from 906 and other identifiers based on a relative hierarchical order between identifiers positioned/located in listing 604. In 910, once the inter-linking relationship is determined, the relationships are conveniently stored in a relationship file for future reference. In 912, link manager 606 determines whether to examine another identifier in listing 604. If yes, processing continues to 906 and another identifier is picked or chosen. If no, processing continues to 914. In 914, link manager 606 determines whether there is another listing that must be examined. A multitude of listings can be used by link manager 606, as will be shown in FIG. 12. If yes, then processing continues to 904 in which another list will be examined. If no, then processing continues to 916. In 916 processing stops.

It is understood that one relationship file is created for containing the inter-linking relationships with suitable organization in the relationship file. For sake of convenience, there is one relationship or link file per identifier of a unit of target information. It will be appreciated that for simplifying the description, individual relationship files correspond to units of target information to be generated.

Referring to flowchart 920 of FIG. 9B, there is depicted a process for creating units of target information and inserting links into the links of target information to inter-link the units of target information as identified from the process of flowchart 900 of FIG. 9A. Operations depicted in flowchart 920 will be performed by link manager 606 of FIG. 6. Once a listing or a multitude of listings has been processed by the link manager 606, in accordance to the operations depicted in FIG. 9A, then link manager 606 may begin the operations depicted in FIG. 9B.

When link manager 606 is ready, 922 begins the process. In 924, link manager 606 obtains a relationship file of an identity that was processed during the generations depicted in flowchart 900. In 926, link manager 606 generates or causes the generation of a unit of target information for the obtained relationship file. In 928, link manager 606 inserts or causes the insertion of information content from a unit of source information into a created unit of target information, the unit of source information having the information content that was identified in listing 604. In 930, link manager 606 inserts or causes the insertion of links identified in the relationship file into the created unit of target information. In 932, link manager 606 determines whether to examine another relationship file. If yes, then processing continues to 924. If no, then processing continues to 934. In 934, processing stops.

Figure 10:
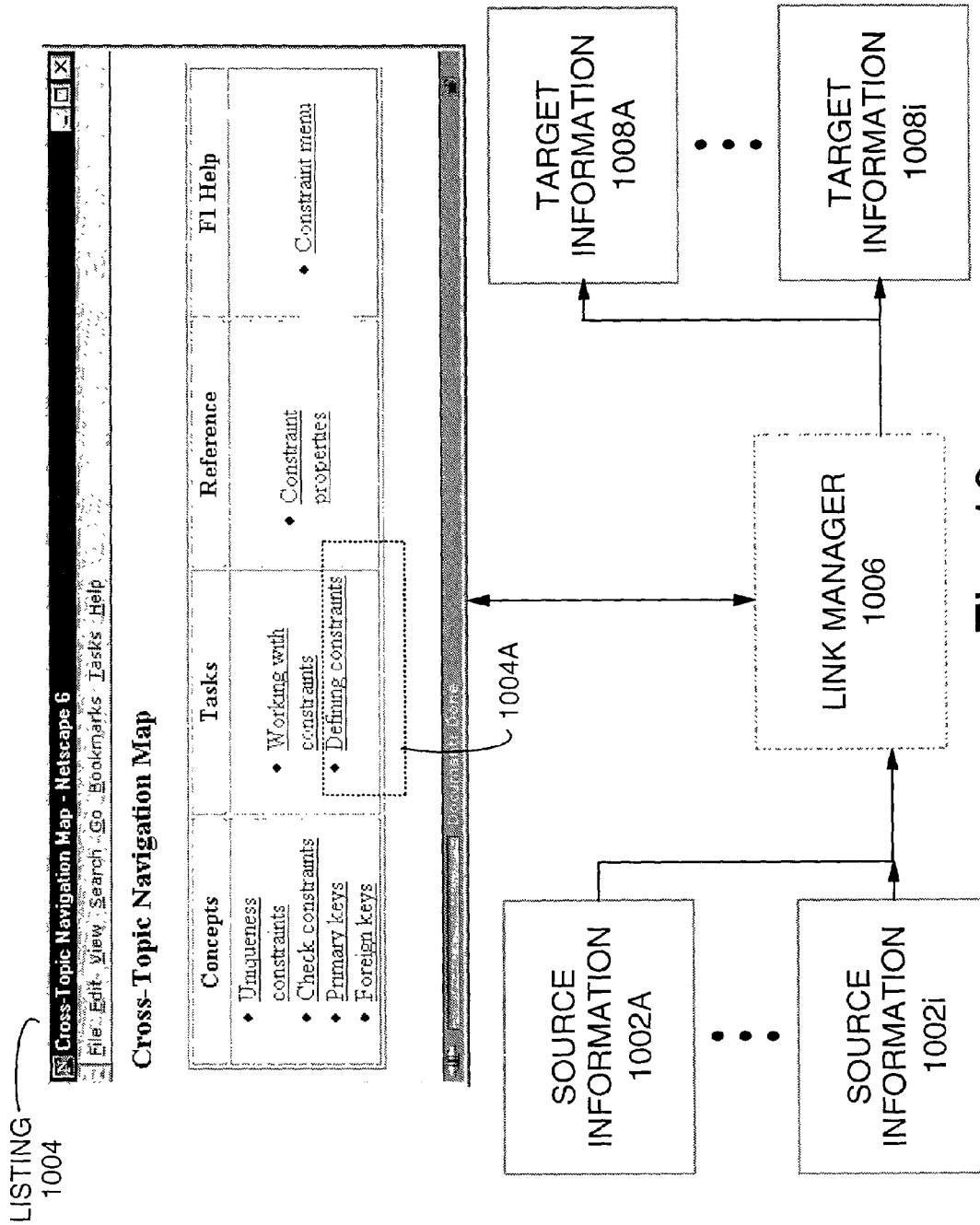
FIG. 10 depicts the link management system of FIG. 6 using a third listing of identifiers.

Referring to FIG. 10, there is depicted a link management system 1000 including units of source information 1002A to **1002*i* inclusive, listing 1004, link manager 1006, and units of target information 1008A to 1008*i*. Listing 1004 is depicted as how a user would view the listing via a web browser. Manager 1006 reads listing 1004 to generate units of target information 1008A to 1008*i***.

It will be appreciated that units of target information 1008A to **1008*i* can already include pre-existing content information (not depicted) and that link manager 1006 uses listing 1004 to determine the inter-linking relationships between units of target information and then inserts appropriate links into corresponding units of target information consummate with the inter-linking relationships identified in listing 1004. However, for simplified explanation of the operation of the invention, units of target information will be generated and information content to be inserted into the units of target information will be transferred from the units of source information while listing 1004** provides the details about the inter-linking relationships between the units and target information.

Appendix 8 reveals the HTML code for listing 1004, which includes several new types of identifiers or data tags to create a hierarchical structure or map in a tabular format. The table depicted in listing 1004 has 4 columns and 2 rows. The first column of the table is labelled "Concepts", the second column is labelled "Tasks", the third column is labelled "Reference", and the fourth column is labelled "Fl Help".

Located in the lower row of the table are various identifiers for identifying topics which are related to the title of the various columns. Matching table data tags "<tr>" and "</tr>" encapsulate or identify a set of cell items or text such as column titles into a single row of the table depicted in listing 1004. Matching table entry data tags "<td>" and "<td>" encapsulate the list items in each cell to be inserted into a single table cell of the row of the table.

Figure 11:
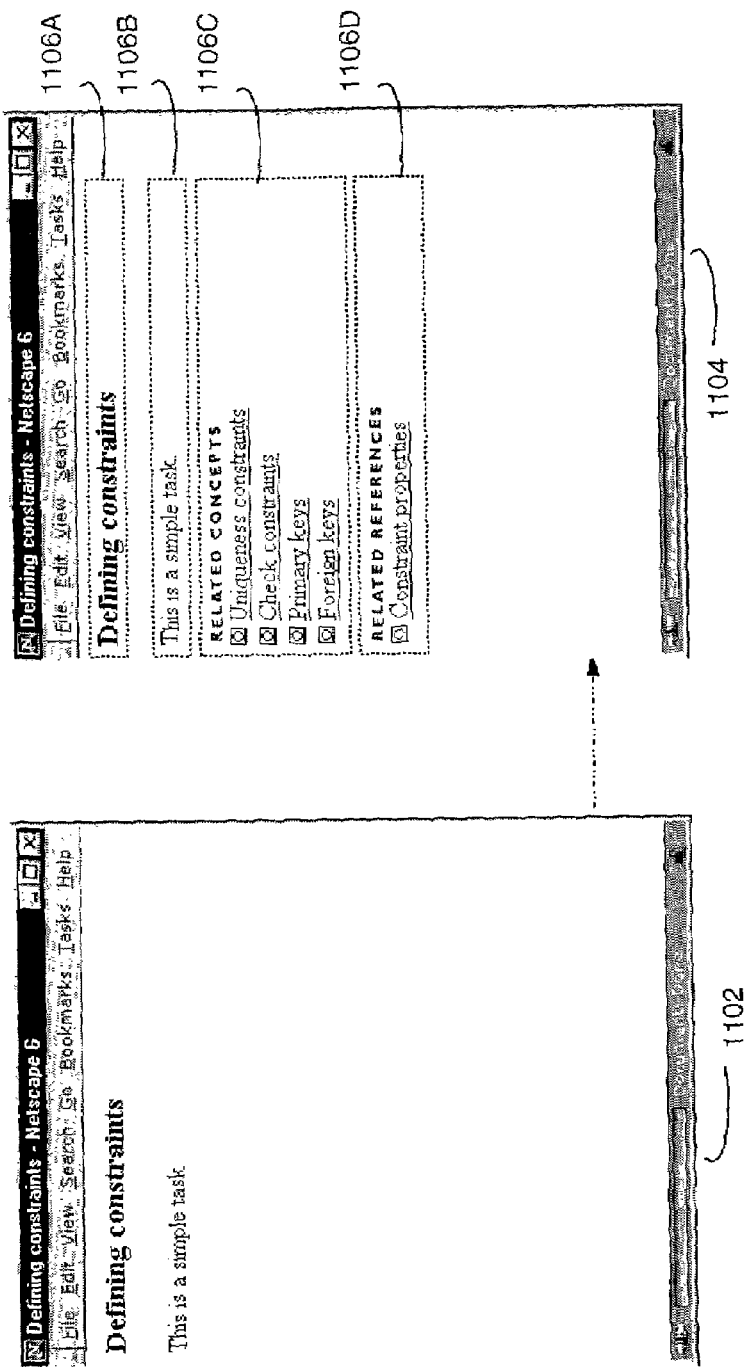
FIG. 11 depicts a third unit of target information generated by using the third listing of FIG. 10.

Referring to FIG. 11, there is depicted an example of a unit of source information 1102 for use with the system 1000 of FIG. 10. Unit of target information 1104 is generated by link manager 1006. Link manager 1006 reads listing 1004 and locates an identifier 1004A for indicating to link manager 1006 to generate unit of target information 1104. Appendix 9 reveals the HTML code of target of information 1104.

Box 1106A includes the title of the unit of target information 1104. The title of the unit of target information 1104 was identified or located in the listing 1004 in which the title is identified by being encapsulated within an appropriate set of matched data tags within the HTML code of listing 1004. Box 1106B includes information content which was taken from the unit of source information 1102 and placed into unit of target information 1104. The identifiers of listing 1004 identified the location of the information content to be located or placed in unit of target information 1104. It will be appreciated that unit 1104 could already contain information content prior to the link manager 1006 inserting the links into unit 1104, in which the link manager is adapted to only inserting links into units of information in which the information contains pre-existing information content. Box 1106C depicts a set of links inserted by link manager 1006 into unit of target information 1104. The links of box 1106C are located/identified in the first column of the table of listing 1004 named "Concepts". Box 1106D depicts another set of links inserted by link manager 1006 into unit of target information 1104. The links of box 1106D were identified/located in the third column of the table of listing 1004 named "Reference".

Figure 12:
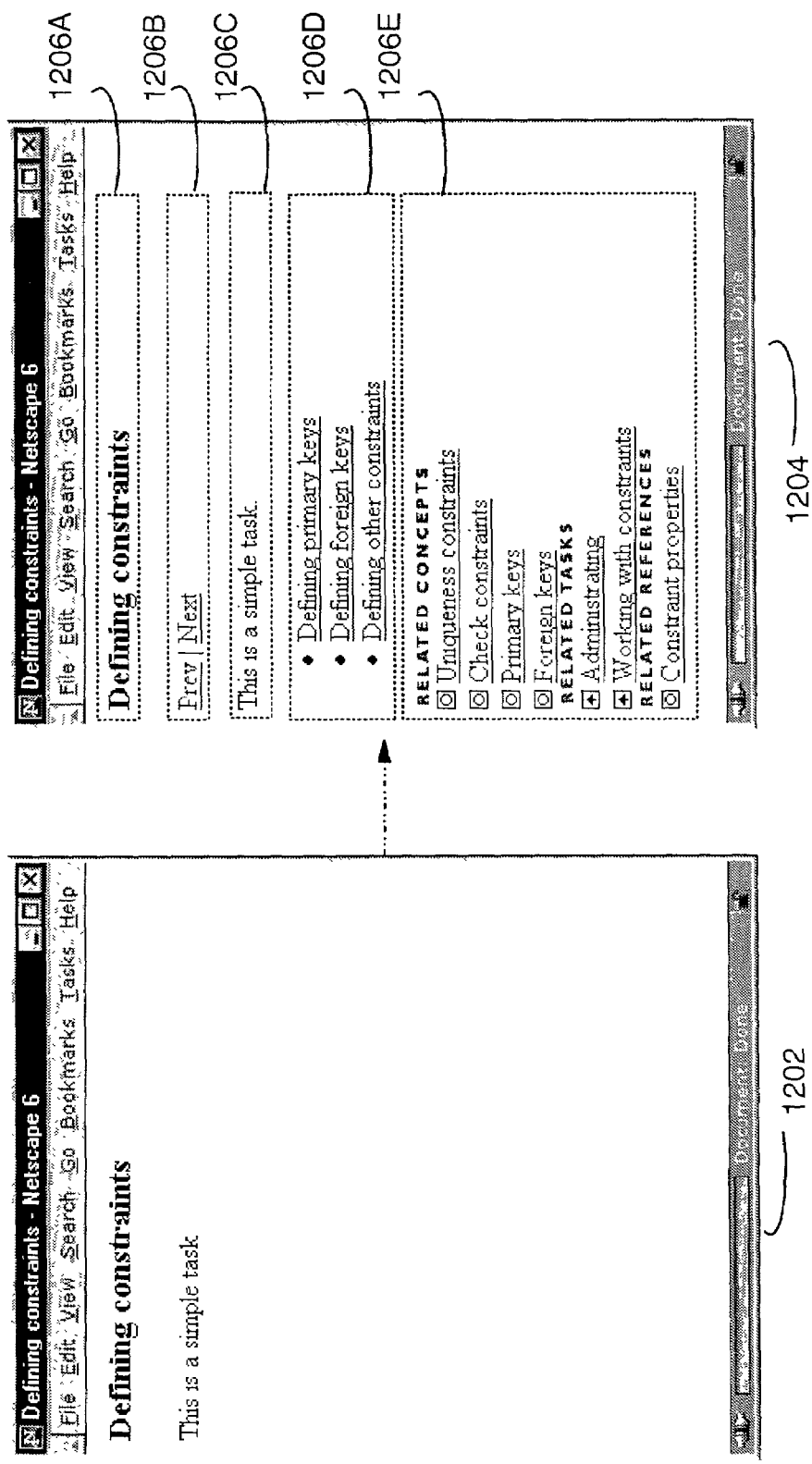
FIG. 12 depicts a fourth unit of target information generated by using the second and the third listings of identifiers of FIGS. 6 and 11 respectively.

Referring to FIG. 12, there is depicted a unit of source information 1202 and a unit of target information 1204. Unit 1204 was generated by link manager 606 of FIG. 6 after reading list 604 of FIG. 6 and list 1004 of FIG. 10. Appendix 10 reveals the HTML code of unit of target information 1204.

Box 1206A contains a title of the unit of target information 1204. The title was identified in either listing 604 or 1004. Box 1206B contains a set of links 'Prev' and 'Next' which was inserted into unit 1204 by link manager 606 as a result of manager 606 reading list 604. Box 1206C includes information content which was taken from the unit of source information 1202 and placed into unit of target information 1204. The identifiers of listing 604 or 1004 identified the location of the information content to be located or placed in unit of target information 1204. Box 1206D includes a set of links inserted into unit 1204 by link manager 606 as a result of using listing 604. Box 1206E includes a set of links inserted into unit 1204 by link manager 606 as a result of using listing 1004. Block 1206E contains a mix of entries from both listings.

The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method performed on a computer system having a Central Processing Unit (CPU) coupled to computer readable memory to store a list of identifiers, and said method to create and manage links amongst units of information based on said list of identifiers arranged in an hierarchical order wherein each identifier identifies an associated unit of information, said method comprising the steps of:

storing said list of identifiers in the computer system, wherein said list of identifiers has a user determined relative hierarchical order to direct a link management system in the creation of said links;

examining said list of identifiers to determine the hierarchical order of said identifiers within said list of identifiers;

linking a unit of information to at least one other unit of information based on the relative hierarchical order of identifiers including:
an identifier identifying said unit of information; and
another identifier identifying said at least one other unit of information, wherein:

said units of information are units of target information;
each said identifier of said list of identifiers is configured to identify source information content of a unit of source information assigned to a unit of target information from among said units of target information;

said list of identifiers further comprises:
a first subset of identifiers that identifies said units of target information to be generated by said system, said first subset hierarchically ordered to indicate preferred linking of said units of target information;
a second subset of identifiers that identifies said source information content to be inserted into said units of target information being identified by said first subset of identifiers;

said step of linking is configured to link a unit of target information from among said units of target information to at least one other unit of target information from among said units of target information based on the relative hierarchical order of identifiers including:
an identifier of said first subset that identifies said unit of target information;
at least one other identifier of said first subset that identifies said at least one other unit of target information; and said method further comprising the steps of:
generating said units of target information; and
inserting at least one source information content into a unit of target information from among said units of target information based on an identifier of said second subset identifying said at least one source information content.

2. The method of claim 1 wherein:
said units of information are units of target information;
each said identifier of said list of identifiers is configured to identify source information content of a unit of source information;

the method further comprising the steps of:
generating said units of target information;
examining said list of identifiers to identify said source information content assigned to a unit of target information from among said units of target information; and
inserting said source information content into a unit of target information from among said units of target information based on the identifier of said unit of target information identifying said source information content.

3. The method of claim 2 wherein a plurality of source information content is assigned to a unit of target information from among said units of target information.

4. The method of claims 2 or 3 wherein said identifiers of said list are data tags of a markup language.

5. The method of claim 1 wherein said list of identifiers further includes a third subset of identifiers that identifies links that interlink units of target information.

6. The method of claim 5 wherein the step of linking is configured to insert URL links.

7. A link management system to create links amongst units of information based on a list of identifiers arranged in an hierarchical order wherein each identifier identifies an associated unit of information, said system comprising:
  a Central Processing Unit (CPU) coupled to a memory, the memory comprising:
  means for storing said list of identifiers, wherein said list of identifiers has a user determined relative hierarchical order to direct said link management system in the creation of said links;
  means for examining said list of identifiers to determine the hierarchical order of said identifiers within said list of identifiers;
  means for linking a unit of information to at least one other unit of information based on the relative hierarchical order of identifiers including:
    an identifier identifying said unit of information; and
    another identifier identifying said at least one other unit of information,
  wherein
  said units of information are units of target information;
  each said identifier of said list of identifiers is configured to identify source information content of a unit of source information;
  the link management system further comprises:
    means for generating said units of target information;
    means for examining said list of identifiers to identify said source information content assigned to a unit of target information from among said units of target information; and
    means for inserting said source information content into a unit of target information from among said units of target information based on the identifier of said unit of target information identifying said source information content.

8. The link management system of claim 1 wherein a plurality of source information content is assigned to a unit of target information from among said units of information.

9. The link management system of claim 1 wherein:
  said units of information are units of target information;
  each said identifier of said list of identifiers is configured to identify source information content of a unit of source information assigned to a unit of target information from among said units of target information;
  said list of identifiers further comprises:
    a first subset of identifiers that identifies said units of target information to be generated by said system, said first subset hierarchically ordered to indicate preferred linking of said units of target information;
    a second subset of identifiers that identifies said source information content to be inserted into said units of target information identified by said first subset of identifiers;
  said means for linking is configured to link a unit of target information from among said units of target information to at least one other unit of target information from among said units of target information based on the relative hierarchical order of identifiers including:
    an identifier of said first subset that identifies said unit of target information;
    at least one other identifier of said first subset that identifies said at least one other unit of target information; and
  link management system further comprises:
    means for generating said units of target information; and
    means for inserting at least one source information content into a unit of target information from among said units of target information based on an identifier of said second subset identifying said at least one source information content.

10. The link management system of claim 9 wherein said list of identifiers further includes a third subset of identifiers that identifies links that inter-link units of target information.

11. The link management system of claim 10 wherein the means for linking is configured to insert URL links.

12. The link management system of claim 8 or 10 wherein said identifiers of said list are data tags of a markup language.

13. A computer program product in a computer system having a Central Processing Unit (CPU) coupled to a computer readable memory, the computer program product including a computer-readable data storage medium tangibly embodying computer readable program code executable on a computer to direct said computer to create and manage links amongst units of information based on a list of identifiers arranged in an hierarchical order wherein each identifier identifies an associated unit of information, said computer program product comprising:
  code to instruct said computer system to store said list of identifiers, wherein said list of identifiers has a user determined relative hierarchical order to direct a link management system in the creation of said links;
  code to instruct said computer system to examine said list of identifiers to determine the hierarchical order of said identifiers within said list of identifiers;
  code to instruct said computer system to link a unit of information to at least one other unit of information based on the relative hierarchical order of identifiers including:
    an identifier identifying said unit of information; and
    another identifier identifying said at least one other unit of information,
  wherein:
  said units of information are units of target information;
  each said identifier of said list of identifiers is configured to identify source information content of a unit of source information;
  said computer program product further comprises:
    code to instruct said computer system to generate said units of target information;
    code to instruct said computer system to examine said list of identifiers to identify said source information content assigned to a unit of target information from among said units of target information;and
    code to instruct said computer system to insert said source information content into a unit of target information from among said units of target information based on the identifier of said unit of target information identifying said source information content.

14. The computer program product of claim 13 wherein a plurality of source information content is assigned to at least one unit of target information.

15. The computer program product of claim 13 wherein:
  said units of information are units of target information;
  each said identifier of said list of identifiers is configured to identify source information content of a unit of source information assigned to a unit of target information;
  said list of identifiers further comprises:
    a first subset of identifiers for identifying said units of target information to be generated by said system, said first subset hierarchically ordered to indicate preferred linking of said units of target information;

a second subset of identifiers for identifying said source information content to be inserted into said units of target information being identified by said first subset of identifiers;

said code to instruct said computer system to link is configured to link a unit of target information to at least one other unit of target information based on the relative hierarchical order of identifiers including:

an identifier of said first subset for identifying said unit of target information;

at least one other identifier of said first subset for identifying said at least one other unit of target information; and said computer program product further comprises:

code to instruct said computer system to generate said units of target information; and code to instruct said computer system to insert at least one source information content into a unit of target information based on an identifier of said second subset identifying said at least one source information content.

16. The computer program product of claim 13 wherein:

said units of information are units of target information;

each said identifier of said list of identifiers is configured to identify source information content of a unit of source information assigned to a unit of target information from among said units of target information;

said list of identifiers further comprises:

a first subset of identifies that identifies said units of target information to be generated by said system, said first subset hierarchically ordered to indicate preferred linking of said units of target information;

a second subset of identifiers that identifies said source information content to be inserted into said units of target information being identified by said first subset of identifiers;

said code to instruct said computer system to link is configured to link a unit of target information from among said units of target information to at least one other unit of target information from among said units of target information based on the relative hierarchical order of identifiers including:

an identifier of said first subset that identifies said unit of target information;

at least one other identifier of said first subset that identifies said at least one other unit of target information; and said computer program product further comprises:

code to instruct said computer system to generate said units of target information; and code to instruct said computer system to insert at least one source information content into a unit of target information from among said units of target information based on an identifier of said second subset identifying said at least one source information content.

17. The computer program product of claim 16 wherein said list of identifiers further includes a third subset of identifiers that identifies links that inter-link units of target information.

18. The computer program product of claim 17 wherein said code to instruct said computer system to link is configured to insert URL links.

* * * * *

UNITED STATES PATENT AND TRADEMARK OFFICE
CERTIFICATE OF CORRECTION

PATENT NO.       : 7,275,066 B2  
APPLICATION NO.  : 09/927103  
DATED            : September 25, 2007  
INVENTOR(S)      : Michael Priestley Page 1 of 1

It is certified that error appears in the above-identified patent and that said Letters Patent is hereby corrected as shown below:

On the Title Page, Item (54)
Title:
"Link Management of Document Structures" ---should read--- "Link Management Using Document Structures"

Signed and Sealed this

Second Day of December, 2008

JON W. DUDAS  
*Director of the United States Patent and Trademark Office*

UNITED STATES PATENT AND TRADEMARK OFFICE
CERTIFICATE OF CORRECTION

PATENT NO. : 7,275,066 B2 Page 1 of 1
APPLICATION NO. : 09/927103
DATED : September 25, 2007
INVENTOR(S) : Michael Priestley It is certified that error appears in the above-identified patent and that said Letters Patent is hereby corrected as shown below:

On the Title Page, Item (54) and Column 1, lines 1 and 2,
Title:
    "Link Management of Document Structures" ---should read--- "Link Management Using Document Structures"

This certificate supersedes the Certificate of Correction issued December 2, 2008.

Signed and Sealed this

Twenty-third Day of December, 2008

JON W. DUDAS
*Director of the United States Patent and Trademark Office*